(12) United States Patent
Rosenlocher et al.

(10) Patent No.: US 8,631,915 B2
(45) Date of Patent: Jan. 21, 2014

(54) BRAKE DISC RINGS WITH PERFORATION HOLES

(75) Inventors: Jens Rosenlocher, Augsburg (DE); Heino Sieber, Ingolstadt (DE); Ralph Renz, Sindelfingen (DE); Moritz Bauer, Augsburg (DE)

(73) Assignee: Audi, AG, Ingolstadt (DE)

( * ) Notice: Subject to any disclaimer, the term of this patent is extended or adjusted under 35 U.S.C. 154(b) by 303 days.

(21) Appl. No.: 12/000,964

(22) Filed: Dec. 19, 2007

(65) Prior Publication Data

US 2008/0164110 A1   Jul. 10, 2008

(30) Foreign Application Priority Data

Dec. 20, 2006   (DE) .................. 10 2006 060 293

(51) Int. Cl.
*F16D 65/12* (2006.01)
(52) U.S. Cl.
USPC ................................. 188/218 XL; 188/264 A
(58) Field of Classification Search
USPC .................. 188/264 A, 218 XL; D12/180
See application file for complete search history.

(56) References Cited

U.S. PATENT DOCUMENTS

| | | | |
|---|---|---|---|
| 3,171,527 A | 3/1965 | Ott | |
| 4,848,521 A * | 7/1989 | Izumine | 188/18 A |
| 5,501,306 A | 3/1996 | Martino | |
| 5,901,818 A | 5/1999 | Martino | |
| 6,119,827 A * | 9/2000 | Militello et al. | 188/218 XL |
| 6,279,697 B1 | 8/2001 | Dickerson et al. | |
| 6,557,672 B1 * | 5/2003 | Wirth | 188/218 XL |
| 6,957,726 B2 * | 10/2005 | Gehrs | 188/218 XL |
| 2004/0140166 A1 * | 7/2004 | Brown et al. | 188/218 XL |

FOREIGN PATENT DOCUMENTS

| | | |
|---|---|---|
| DE | 70 11 084 U | 7/1970 |
| DE | 7011084 | 7/1970 |
| DE | 2 257 175 | 5/1974 |
| DE | 22 57 176 A | 5/1974 |
| DE | 74 41 560 U | 5/1975 |
| DE | 7441560 | 5/1975 |
| DE | 2 901 349 | 7/1979 |
| DE | 29 01 349 A1 | 7/1979 |
| DE | 00 57 618 A1 | 8/1982 |
| DE | 198 24 465 A1 | 12/1999 |
| DE | 199 25 003 A1 | 12/2000 |
| DE | 101 46 573 C1 | 6/2003 |
| DE | 101 57 995 A1 | 6/2003 |
| DE | 103 04 299 A1 | 9/2004 |
| EP | 0057618 | 8/1982 |
| GB | 2 309 273 A | 7/1997 |
| JP | 2005-0 61 463 A | 3/2005 |

OTHER PUBLICATIONS

Dr.-Ing. Manfred Burckhardt, Fahrwerktechnik: Bremsdynamik und Pkw-Bremsanlagen, Vogel Buchvertag, 1997, pp. 285-287.
Bert Breuer/Karlheinz H. Bill (Hrsg)., Bremsenhandbuch, Grundlagen, Komponenten, Systeme, Fahrdynamik, 2003, pp. 169-172.
German Search Report dated Jul. 10, 2008.

* cited by examiner

*Primary Examiner* — Robert A Siconolfi
*Assistant Examiner* — James Hsiao
(74) *Attorney, Agent, or Firm* — Novak Druce Connolly Bove + Quigg LLP

(57) ABSTRACT

Brake disk rings which have perforation holes perpendicular to the plane of the friction surfaces, characterized in that the perforation holes each have a distance from their nearest neighbors which is always at most 30 mm and on average is at least twice the average hole diameter.

16 Claims, 2 Drawing Sheets

BRAKE DISC RINGS WITH PERFORATION HOLES

CROSS-REFERENCE TO RELATED APPLICATIONS

This application claims priority from German Application No. 102006060293.5 filed Dec. 20, 2006, hereby incorporated by reference in its entirety.

The invention relates to brake disk rings with perforation holes, brake disks which encompass brake disk rings with perforation holes, and brake systems which contain them.

BACKGROUND OF THE INVENTION

Brakes disks for disk brakes, especially in high-performance vehicles, are made with perforation holes in the friction surfaces (outer cover surfaces) of the cylindrical ring-shaped brake disks. In the case of solid brake disks the holes conventionally extend through the entire disk thickness, in the case of internally ventilated brake disks they can also extend only from the friction surface to the inner cavity. The advantage of these perforation holes is improved cooling and more rapid breakdown of the moisture film present when friction surface are wet compared to unperforated brake disk (rings). Another advantage of perforated brake disk (rings) is the cleaning effect of the perforation holes for the friction coating applied to the brake shoes. Wear particles are at least partially removed through the perforation holes, and by the shearing and peeling action of the edges of the perforation holes a "cleaner" friction lining surface without deposits of wear and similar particles is produced.

Compared to unperforated brake disk (rings) this also leads to constant friction behavior under high stresses.

Within the context of this application brake disk (ring) refers to a brake disk ring or a brake disk which encompasses the brake disk ring. In this connection, an integral brake disk is also regarded as encompassing a brake disk ring.

DE 29 01 349 A discloses a metallic brake disk with reduced tendency to squealing and improved heat dissipation, in the friction surfaces of which openings are formed which have different distances from one another in the peripheral direction. In this connection, the openings as shown in the drawings are made only in the area traversed by the brake shoes which are provided with friction linings (brake linings) and are referred to as "brake bodies".

German Utility Model DE 74 41 560 relates to a disk brake with perforated brake disk for two-wheeled vehicles, the perforation being designed to preclude the adverse effect of water having reached the brake disk on the braking action. Here rows of holes are located within the ring surface traversed by the friction linings of the brake shoes.

German Utility Model DE 70 11 084 likewise describes a brake disk with openings which partially or completely penetrate the brake disk, the openings being located in the parts of the friction surface which come into frictional engagement with the friction linings of the brake.

Published Patent Application DE 22 57 176 A describes internally ventilated disk brakes which comprise two disks which run with a parallel distance, these disks being connected to cross ribs, and openings running in the brake surface in the vicinity of the cross ribs. The openings are made conical, the smaller diameter being on the friction surface side of the disks.

U.S. Pat. No. 5,501,306 discloses a brake disk which contains a brake ring with a plurality of openings or holes, these openings or holes always being located along a radius in the brake ring. The brake ring is solid except for holes ("a solid brake ring"), that is, it particularly does not have any cooling channels within. The purpose of making the holes is to reduce the weight of the brake disk.

U.S. Pat. No. 6,279,697 B1 discloses a brake disk having a surface which acts as a friction surface which is structured by nondirectional indentations which are produced by electrical discharges and the resulting vaporization of metal at the respective locations. In this instance as well, brake disks which are otherwise solid are also machined in this way. The directional (radially or concentrically to the periphery) structures produced by surface machining on the friction surface generate noise during the braking process or lead to increased wear of the brake linings.

Finally, German Published Patent Application 101 57 995 A1 discloses a brake disk of a fiber-reinforced material with perforation holes and radial or involute-shaped cooling channels. The perforation holes promote cooling of the brake disk and improve wet response behavior of the brakes, since water and the water vapor which forms during braking can escape from the surface of the brake disk through the perforation holes.

SUMMARY OF THE INVENTION

Figure 1:
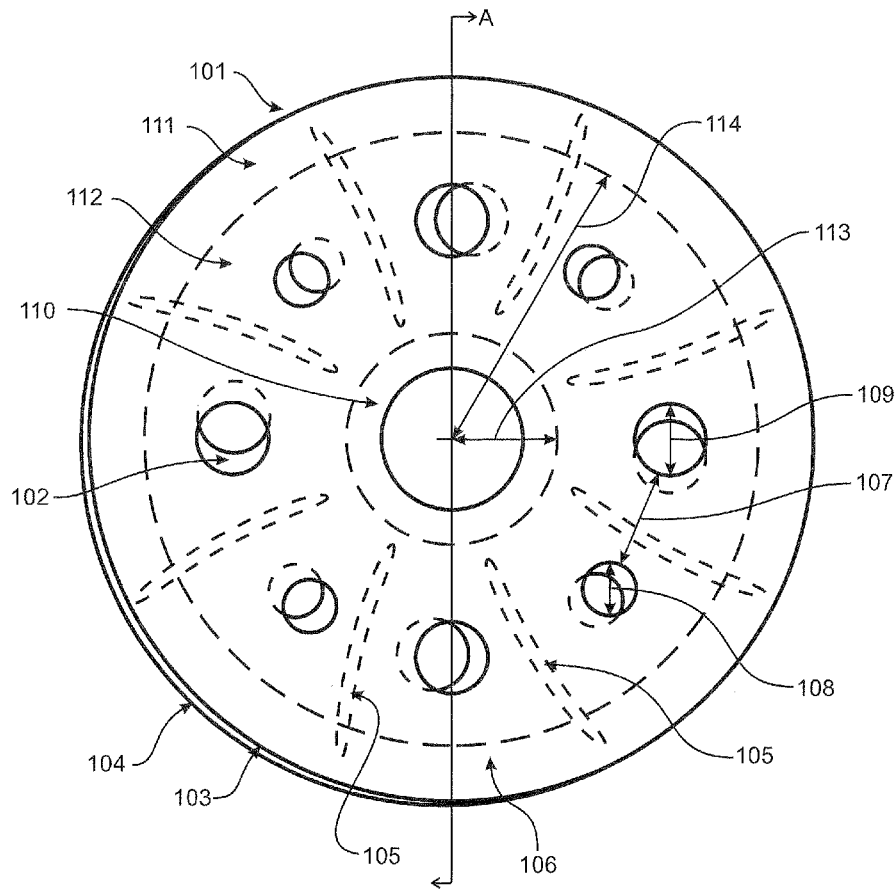
FIG. 1 shows a top view of a brake disk according to the invention.
Figure 2:
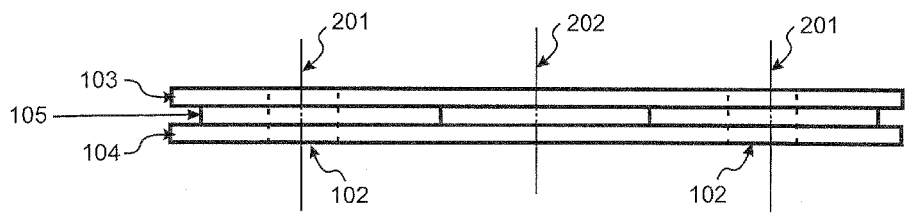
FIG. 2 shows a cross-sectional view of a brake disk according to the invention.
Figure 3:
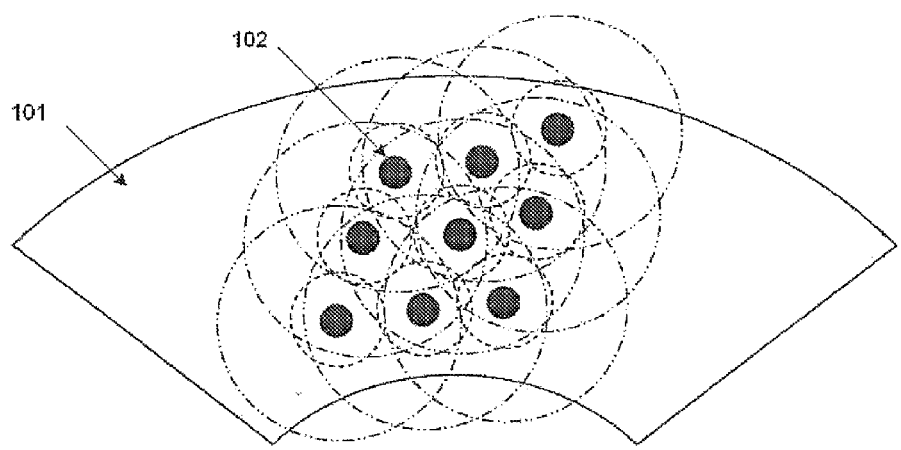
FIG. 3 shows a top view of a portion of a brake disk according to the invention.
Figure 4:
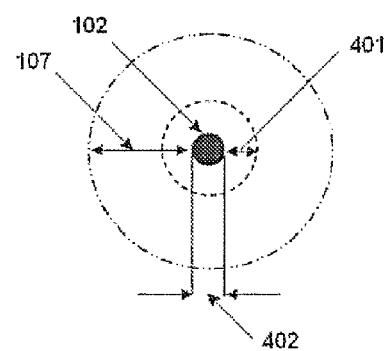
FIG. 4 shows a perforation and distances measured relative to the perforation.

In the studies underlying this invention, and as illustrated in FIGS. 1, 2, 3, and 4, it was found that especially favorable results are obtained in those brake disks 101 which have perforation holes 102 with axes of symmetry 201 preferably essentially parallel to the axis of rotation 202 of the brake disk and thus perpendicular to the plane of the friction surfaces, and in which preferably an internally ventilated brake disk is used which consists of at least three layers, the two outer layers, first layer 103 and second layer 104, as friction layers in the braking process being in tribologic contact with the friction linings of the brake shoes, and the innermost layer consisting of ribs 105 which connect the two layers which follow to the outside and enclose the cooling channels 106. By preference, between the respective outer layers and the innermost layer there is another layer which preferably has the same material composition as the ribs and connects the friction layers to the innermost layer, these other layers especially assuming the task of ensuring mechanical stability of the brake disk. In the process especially favorable results with respect to thermal and mechanical stress on the brake disk were obtained, especially in the area of the friction layers when perforation holes are also made outside the area of the surface traversed by the friction linings of the brake shoes in the braking process, and if all perforation holes have a maximum distance 107 from their nearest neighbors which is always at most 30 mm and a minimum distance 401 from their nearest neighbors which is always at least twice the average hole diameter 402. The average hole diameter here is the average of the diameter of two holes 108, 109 examined in determining the distance.

DETAILED DESCRIPTION OF EMBODIMENTS OF THE INVENTION

The subject matter of the invention is therefore brake disk rings and brake disks encompassing them which have perforation holes preferably perpendicular to the plane of the friction surfaces, the perforation holes each having from their nearest neighbors a distance which is always at most 30 mm and on average is at least twice the average hole diameter. In this connection perforation holes are also made outside of the area traversed by the brake shoes, by preference, at least a percentage of 5% of all perforation holes is outside the traversed area.

Another subject matter of the invention is brake systems which contain brake shoes and those brake disk rings attached to a so-called chamber, the chamber causing a nonpositive connection between the brake disk ring and the axle. The chamber can be made integral with the brake disk ring, in particular from identical material, can be connected directly to it, can be welded to it, or can be connected to it by mechanical fasteners such as screws, bolts or rivets. The material of the chamber can be a metal, preferably high-grade steel, titanium, aluminum or alloys which contain a proportion of at least 20% of one of these metals by mass. If the brake disk ring is of a ceramic material, it is also preferred that the chamber likewise be made of the same ceramic material, especially a material of the same type.

The perforation holes usually have diameters of approximately 2 mm to approximately 12 mm, ranges from 3 mm to 10 mm, and in particular from 4 mm to 9 mm, being preferred. To the extent perforation holes with different diameters are present, the distance between two directly adjacent perforation holes is preferably at least the diameter of the larger perforation hole.

It is furthermore preferred that the perforation holes be distributed essentially uniformly over the friction surface. In this connection, the edge areas, that is, the area on the inside edge 110 and the area on the outside edge 111 of the circular annular disk, remain free of perforation holes. The edge area here is a circular annulus which has a radial extension of twice the average diameter of all perforation holes in the direction to the interior of the circular annular disk. A distribution is referred to as "essentially uniform" when the number of perforation holes relative to the length of the average diameter of a ring zone or annular band 112 (which is bordered by an inside and an outside diameter) in all ring zones with the same difference of the inner radius 113 and outer radius 114, this difference preferably being between twice and five times, especially preferably between three and four times the average diameter of all perforation holes, differs from these circular annular disks by not more than 80%, preferably not more than 50%, and especially preferably not more than 30% of the highest value.

It is also preferred, according to the invention, that some of the perforation holes, preferably at least 5% of all perforation holes, be placed in the area of the ribs. In this connection, the respective perforation hole runs to at least 30% of its cross sectional area within the rib.

The advantages which can be achieved with an arrangement of the perforation holes according to the invention are especially the avoidance of local overheating of the brake disk in the braking process by the heat of friction and the prevention of the build-up of a film of moisture on the friction surface which reduces the coefficient of friction.

In the research which formed the basis of this invention, it was found that the condition of maximum distance of two adjacent perforation holes and formation of perforation holes outside of that area of the brake disk, which is traversed by the brake shoes, can reduce the heat-up of the brake disk in (braking) operation by 20 K to 50 K compared to disks in which the distance between two adjacent perforation holes was always more than 30 mm, and which did not have any holes outside of that surface of the brake disk which was in frictional engagement with the friction linings attached to the brake shoes. Furthermore, it was found that the wear of the friction linings on the brake shoes increased greatly when a minimum distance between each of the two adjacent perforation holes, which is less than twice of the average diameter of the perforation holes under consideration, was not reached. This was additionally apparent from the reduced ease of braking due to increased noise development. It is therefore important to observe both limits for the distance of adjacent perforation holes.

If the adjacent perforation holes have different diameters, the braking ease-behavior was especially favorable, with reduced heating and improved wet response behavior, when the distance between two adjacent perforation holes was at least one and one half times of the diameter of the larger hole. In this case it proved furthermore favorable to limit the maximum distance to twice the sum of the diameter of the two perforation holes under examination, but 30 mm should not be exceeded.

The perforation holes arranged according to the invention in brake disks of fiber-reinforced ceramic materials, especially those ceramic brake disks reinforced with carbon fibers, with a matrix containing essentially silicon carbide and silicon and carbon, are especially advantageous. Brake disk rings such as these have at least three layers, the outer layers as friction layers being optimized with respect to their tribologic behavior, and the inner layer causing the mechanical strength and contributing to cooling by the cooling channels provided there. In this connection the inner layer can be divided into three zones, the innermost layer containing cooling channels and ribs which connect the subsequent layers, and the layers located between this innermost layer and the friction layers forming the strength members. Ordinarily, in the case of fiber-reinforced ceramic materials, the material composition of the friction layer can be different from that of the indicated inner layers.

In this instance, it has been found to be especially favorable to form the perforation holes in the so-called preceramic state, that is, before conversion of the carbon from the matrix of the preliminary body into silicon carbide by infiltration of the porous body with liquid silicon and the subsequent reaction. In this so-called CFC state in which the body consists of carbon fiber-reinforced porous carbon, the body can be easily machined by drilling or turning or milling, thus machining is technically simple and economically favorable.

The invention claimed is:

1. A brake disk formed of a friction material including a plurality of holes having centerlines disposed substantially parallel to the axis thereof, wherein, an average spacing between adjacent holes is at least twice the average width of the holes, but does not exceed 30 mm,
   wherein said holes are cylindrical,
   wherein said holes provided with different diameters and the distance between each set of adjacent holes of different diameters is at least the diameter of the hole of said adjacent holes having the greater diameter.

2. The brake disk according to claim 1, wherein said holes are disposed in an area beyond an area engagable by a brake shoe.

3. The brake disk according to claim 2, wherein at east 5% of said holes are disposed in an area beyond said area engaged by a brake shoe.

4. The brake disk according to claim 1, wherein said holes are uniformly dispersed in an annular and having an inner radius, an outer radius greater than said inner radius and less than an outer radius of said disk and a radial spacing between twice and five times the average diameter of said holes, where the smallest of said holes differs in diameter by no more than 80 of the largest of said holes.

5. The brake disk of claim 1, wherein said disk comprises a pair of spaced disks formed of a friction material, spaced by ribs, and wherein at least 5% of said holes are disposed in the area of said ribs.

6. The brake disk according to claim 1, wherein said disk is formed of fiber-reinforced ceramic materials.

7. The brake disk according to claims 6 made from a method comprising forming said holes with cores while molding said disk of said fiber-reinforced ceramic materials.

8. The brake disk according to claim 5 including means for attaching said disk to a vehicle axle for cooperation of a brake shoe in a brake assembly.

9. A brake disk formed of a friction material including a plurality of holes having centerlines disposed substantially parallel to the axis thereof, wherein an average spacing between adjacent holes is at least twice the average width of the holes, but does not exceed 30 mm, wherein said holes are cylindrical, wherein said holes are uniformly dispersed in an annular band having an inner radius, an outer radius greater than said inner radius and less than an outer radius of said disk and a radial spacing between twice and five times the average diameter of said holes, where the smallest of said holes differs in diameter by no more than 80% of the largest of said holes.

10. The brake disk according to claim 9, wherein said holes are disposed in an area beyond an area engagable by a brake shoe.

11. The brake disk according to claim 10, wherein at least 5% of said holes are disposed in an area beyond said area engaged by a brake shoe.

12. The brake disk according to claim 9, wherein said holes are provided with different diameters, and the distance between each set of adjacent holes of different diameters is at least the diameter of the hole of said adjacent holes having the greater diameter.

13. The brake disk of claim 9, wherein said disk comprises a pair of spaced disks formed of a friction material, spaced by ribs, and wherein at least 5% of said holes are disposed in the area of said ribs.

14. The brake disk according to claim 9, wherein said disk is formed of fiber-reinforced ceramic materials.

15. The brake disk according to claims 14 made from a method comprising forming said holes with cores while molding said disk of said fiber-reinforced ceramic materials.

16. The brake disk according to claim 13 including means for attaching said disk to a vehicle axle for cooperation of a brake shoe in a brake assembly.

* * * * *